(12) United States Patent
Peluso et al.

(10) Patent No.: US 12,088,203 B2
(45) Date of Patent: Sep. 10, 2024

(54) PARTIAL POWER CONVERTERS AND SPLIT PARTIAL POWER CONVERSION

(71) Applicant: Infineon Technologies Austria AG, Villach (AT)

(72) Inventors: Luca Peluso, Villach (AT); Matthias J. Kasper, Villach (AT); Giuseppe Bernacchia, Villach (AT)

(73) Assignee: Infineon Technologies Austria AG, Villach (AT)

( * ) Notice: Subject to any disclaimer, the term of this patent is extended or adjusted under 35 U.S.C. 154(b) by 205 days.

(21) Appl. No.: 17/735,558

(22) Filed: May 3, 2022

(65) Prior Publication Data
US 2023/0361679 A1 Nov. 9, 2023

(51) Int. Cl.
*H02M 3/158* (2006.01)
*H02J 9/06* (2006.01)

(52) U.S. Cl.
CPC .......... *H02M 3/1582* (2013.01); *H02J 9/061* (2013.01)

(58) Field of Classification Search
CPC .... H02M 3/1582; H02M 3/1584; H02M 3/18; H02M 3/285; H02M 3/3155; H02M 3/33507; H02M 3/33523; H02M 3/33573; H02M 3/33576; H02M 3/33592; H02J 9/061; H02J 9/068; H02J 9/06; H02J 9/04
See application file for complete search history.

(56) References Cited

U.S. PATENT DOCUMENTS

| 5,381,327 A * | 1/1995 | Yan ...................... H02M 7/4807 363/24 |
| 2014/0077885 A1* | 3/2014 | Frium ...................... H03F 3/217 330/297 |

(Continued)

FOREIGN PATENT DOCUMENTS

DE    102013102433 A1    9/2013

OTHER PUBLICATIONS

Anzola, Jon, et al., "Review of Architectures Based on Partial Power Processing for DC-DC Applications", IEEE Access, IEEE, USA, vol. 8, Jun. 1, 2020 (Jun. 1, 2020), pp. 103405-103418, XP011792358.

(Continued)

*Primary Examiner* — Nguyen Tran
(74) *Attorney, Agent, or Firm* — Armis IP Law, LLC

(57) ABSTRACT

A first partial power converter implementation receives and converts an input voltage into multiple auxiliary voltages including a first auxiliary voltage and a second auxiliary voltage. The first partial power converter produces a first output voltage as a first summation of the first auxiliary voltage and the input voltage; the first partial power converter produces a second output voltage as a second summation of the second auxiliary voltage and the input voltage. A second partial power converter implementation as discussed herein receives a first auxiliary input voltage referenced with respect to an output voltage of the power converter. The second partial power converter also receives a second auxiliary input voltage referenced with respect to the output voltage. The second partial power converter (Continued)

converts the first auxiliary input voltage and the second auxiliary input voltage into the output voltage to power a load.

14 Claims, 12 Drawing Sheets

(56) References Cited

U.S. PATENT DOCUMENTS

2016/0200202 A1* 7/2016 She .................. B60L 50/51
307/10.1
2022/0085641 A1 3/2022 Hirota

OTHER PUBLICATIONS

Cao, Yuliang, et al. "Design and Implementation of 18-kw 500-khz 98.8% Efficiency High-Density Battery Charger with Partial Power Processing", IEEE Journal of Emerging and Selected Topics in Power Electronics, IEEE, Piscataway, NJ, USA, vol. 10, No. 6, , Aug. 29, 2021 (Aug. 29, 2021), pp. 7963-7975, XP011929788.

Chuanhong, Zhao, et al., "A Novel Three-Phase Three-Port UPS Employing a Single High-Frequency Isolation Transformer", Power Electronics Specialist Conference, 2004. PESC 04. 2004 IEEE 35th Annual, Aachen, Germany Jun. 20-25, 2004 (Jun. 20, 2004), pp. 4135-4141, XP010739066,.

Extended Search Report, EP 23 17 1324, Oct. 4, 2023, pp. 1-11.

Vazquez N, et al., "Two-Stage Uninterruptible Power Supply With High Power Factor", IEEE Transactions on Industrial Electronics, IEEE Service Center, Piscataway, NJ, USA, vol. 55, No. 8, Aug. 1, 2008 (Aug. 1, 2008), pp. 2954-2962, XP011225184.

* cited by examiner

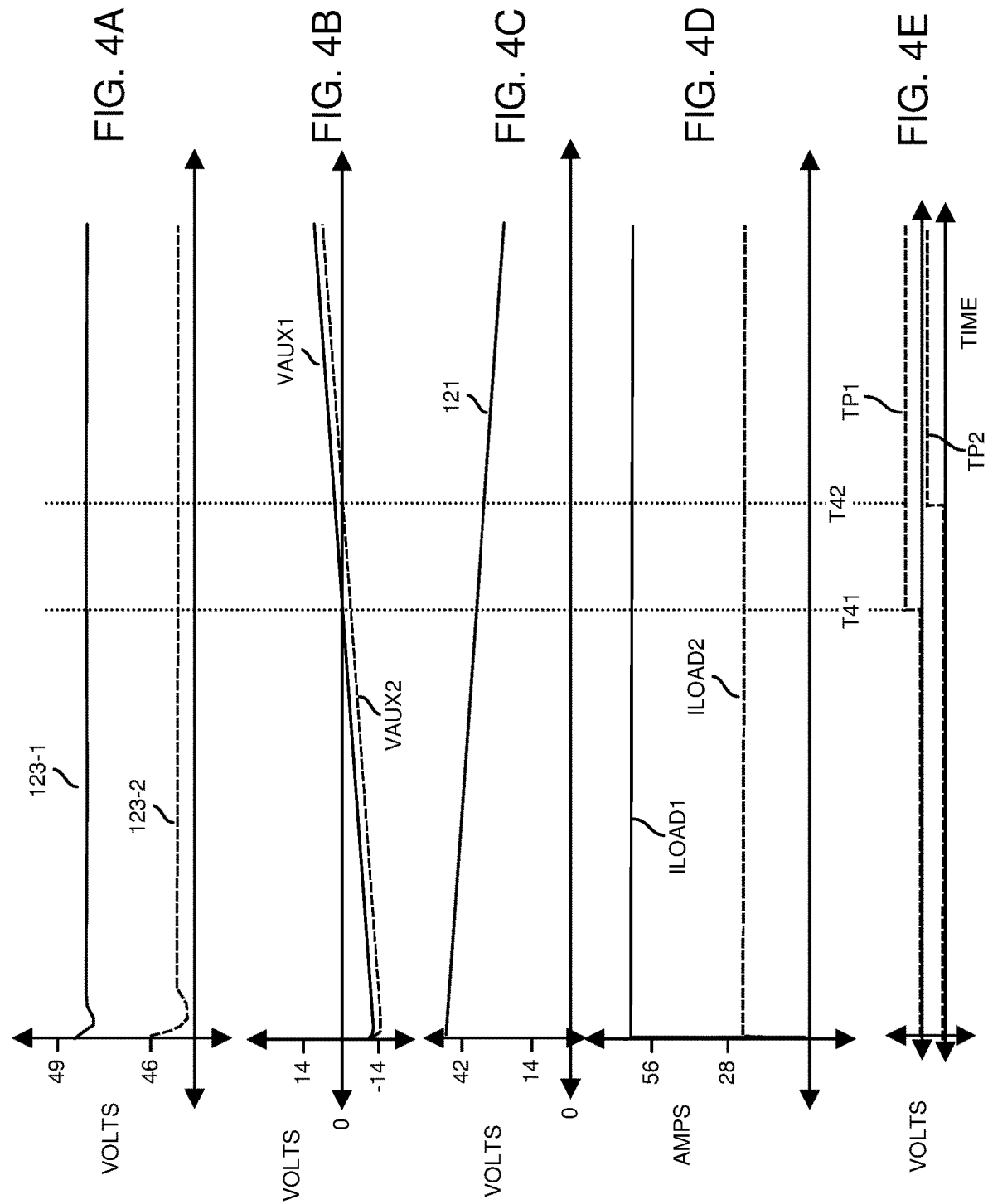

PARTIAL POWER CONVERTERS AND SPLIT PARTIAL POWER CONVERSION

BACKGROUND

A conventional backup power system typically includes a battery to store energy to power a load during outages. For example, a load is typically powered via a main input voltage during normal operating conditions. When a power outage occurs, the main input voltage is no longer available. In such an instance, the backup power system supplies power the load via converting energy stored in the battery into a backup voltage supplied to the load.

Conventional power converter topologies include the well-known buck, boost, 4-switch buck-boost converters, etc. When implementing these topologies, the corresponding semiconductor devices must be rated according to the total output voltage (for boost converters) or total input voltage (for buck converters). This mandates employment of devices with a non-optimal FOM. Moreover, despite a narrow conversion range of voltage provided by a battery, and because of the high power consumption level of a load (3 kW in the considered case), the conventional converter experiences high currents impacting not only the efficiency of the power converter but also the cost and power density as both passive and active components need to be chosen according to such high currents.

Conventional partial power converters provide an ability to convert an input voltage into a respective output voltage. For example, a conventional partial power converter receives and input voltage, produces a respective auxiliary voltage. The auxiliary voltage is summed with the input voltage to produce a single output voltage to power load.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure includes an apparatus comprising a partial power converter. The partial power converter may receive an input voltage; the primary playback device may convert the input voltage into multiple auxiliary voltages including a first auxiliary voltage and a second auxiliary voltage; the partial power converter may produce a first output voltage as a first summation of the first auxiliary voltage and the input voltage; and the partial power converter may produce a second output voltage as a second summation of the second auxiliary voltage and the input voltage.

The partial power converter may use at least a portion of power received from the first auxiliary voltage to produce the second auxiliary voltage during a condition in which the first auxiliary voltage is opposite in polarity with respect to the second auxiliary voltage.

The partial power converter may include a first capacitor to store the first auxiliary voltage; the first capacitor may be coupled in series with an input voltage source that provides the input voltage. The partial power converter may include a second capacitor to store the second auxiliary voltage; the second capacitor may be coupled in series with the input voltage source.

The first auxiliary voltage may be offset with respect to the input voltage; the second auxiliary voltage may be offset with respect to the input voltage.

The input voltage may be received from any suitable power source. The partial power converter may be a bidirectional power converter operative to switch between: i) a first mode of outputting the first output voltage from a first port of the partial power converter and outputting the second output voltage from a second port of the partial power converter, and ii) a second mode of charging the power source based on one or more of a first voltage received from the first port and a second voltage received from the second port.

The partial power converter may include: a primary side circuit to receive the input voltage, the primary side circuit may include a first resonant circuit. The partial power converter may include a first secondary side circuit including a first secondary winding magnetically coupled to the primary side circuit, the first secondary side circuit operative to produce a first intermediate voltage that is converted into the first auxiliary voltage. The partial power converter may further include a second secondary side circuit including a second secondary winding magnetically coupled to the primary side circuit, the second secondary side circuit may produce a second intermediate voltage that is converted into second auxiliary voltage.

Further, note that the first secondary side circuit may include a second resonant circuit that produces the first intermediate voltage; the second secondary side circuit may include a third resonant circuit operative to produce the second intermediate voltage.

The partial power converter may include: a first resonant capacitor supporting generation of the first auxiliary voltage; a second resonant capacitor supporting generation of the second auxiliary voltage.

The partial power converter may include one or more polarity controllers. For example, the partial power converter may include a first polarity controller to control or change a polarity of the first auxiliary voltage; and the partial power converter may include a second polarity controller operative to control or change a polarity of the second auxiliary voltage.

The partial power converter may include a first capacitor to store a first intermediate voltage (a.k.a. Vmid1 or VINT1) derived from the input voltage; the partial power converter may convert the first intermediate voltage into the first auxiliary voltage. The partial power converter may include a second capacitor to store a second intermediate voltage (a.k.a., Vmid2 or VINT2) derived from the input voltage; the partial power converter may convert the second intermediate voltage into the second auxiliary voltage.

The partial power converter may include any number of transistors. For example, the partial power converter may include first transistors and corresponding circuit, the first transistors may be controlled to convert the input voltage into a first intermediate voltage and a second intermediate voltage; the partial power converter may include second transistors, the second transistors may be controlled to convert the first intermediate voltage into the first auxiliary voltage and the second intermediate voltage into the second auxiliary voltage.

The partial power converter may include any number of resonant circuits. For example the partial power converter may include an LLC circuit operative to convert the input voltage into the first auxiliary voltage and the second auxiliary voltage.

The partial power converter may include a first resonant power converter stage including a primary winding magnetically coupled to a first secondary winding and a second secondary winding; the first secondary winding may produce a first intermediate voltage converted into the first auxiliary voltage; the second secondary winding may produce a second intermediate voltage converted into the second auxiliary voltage.

The first auxiliary voltage may be a first differential voltage summed with the input voltage; the second auxiliary voltage may be a second differential voltage summed with the input voltage.

On the secondary side of the power supply as discussed herein, the partial power converter may include a first resonant circuit to produce the first intermediate voltage; the partial power converter may include a second resonant circuit operative to produce the second intermediate voltage.

The partial power converter may include a first partial power converter circuit and a second partial power converter circuit; the first partial power converter circuit may derive the first auxiliary voltage based at least in part from the input voltage; the second partial power converter circuit may derive the second auxiliary voltage based at least in part from the input voltage. The first partial power converter circuit and the second partial power converter circuit may be at least partially integrated and share use of a first resonant circuit operative to receive the input voltage and drive: i) output circuitry of the first partial power converter producing a first intermediate voltage used to produce the first auxiliary voltage, and ii) output circuitry of the second partial power converter producing a second intermediate voltage used to produce the second auxiliary voltage.

The apparatus as discussed herein may include a controller. The controller may: i) regulate a magnitude of the first output voltage, the first output voltage may power a first load; and ii) regulate a magnitude of the second output voltage, the second output voltage may power a second load, a magnitude of the first output voltage different than a magnitude of the second output voltage.

The partial power converter may include or may be a multi-stage power converter including a first power converter stage and a second power converter stage. The first power converter stage may convert the input voltage into a first intermediate voltage and a second intermediate voltage. The second power converter stage may: i) convert the first intermediate voltage into the first auxiliary voltage, and ii) convert the second intermediate voltage into the second auxiliary voltage. The first power converter stage may be a resonant power converter stage including a primary winding magnetically coupled to a first secondary winding and a second secondary winding. The first secondary winding may produce the first intermediate voltage; the second secondary winding may produce the second intermediate voltage.

Further implementations herein may include a method comprising: receiving an input voltage; converting the input voltage into multiple auxiliary voltages including a first auxiliary voltage and a second auxiliary voltage; producing a first output voltage as a first summation of the first auxiliary voltage and the input voltage; and producing a second output voltage as a second summation of the second auxiliary voltage and the input voltage.

A second apparatus herein may include a partial power converter. The partial power converter: receives a first auxiliary input voltage, the first auxiliary input voltage referenced with respect to an output voltage of the partial power converter; receives a second auxiliary input voltage, the second auxiliary input voltage referenced with respect to the output voltage; and converts the first auxiliary input voltage and the second auxiliary input voltage into the output voltage to power a load.

The first auxiliary voltage may be generated from a first voltage source supplying a first input voltage; a magnitude of the first input voltage may be a summation of the output voltage and the first auxiliary voltage. The second auxiliary voltage may be generated from a second voltage source supplying a second input voltage; a magnitude of the second input voltage may be a summation of the output voltage and the second auxiliary voltage. The partial power converter may include: a first circuit to receive the first input voltage, the first circuit including a first resonant circuit comprising a first secondary winding; a second circuit operative to receive the second input voltage, the second circuit including a second resonant circuit comprising a second secondary winding; and a third circuit magnetically coupled to the first secondary winding and the second secondary winding, the third circuit operative to produce the output voltage. The third circuit may include a third resonant circuit operative to produce the output voltage. Note further that the power supply as discussed herein may include two second DC/DC stages (such as buck converters) which link the first and the second input voltage to first and second resonant circuits respectively. Additional details are further discussed below with respect to the drawings.

This disclosure further includes a method comprising: receiving a first auxiliary input voltage, the first auxiliary input voltage referenced with respect to an output voltage of the partial power converter; receiving a second auxiliary input voltage, the second auxiliary input voltage referenced with respect to the output voltage; and converting the first auxiliary input voltage and the second auxiliary input voltage into the output voltage to power a load.

These and other more specific implementations are disclosed in more detail below.

Note that although implementations as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different implementations as described herein.

Yet other implementations herein include software programs to perform the steps and operations summarized above and disclosed in detail below. One such implementation comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, implementations herein are directed to methods, systems, computer program products, etc., that support operations as discussed herein.

One implementation herein includes a computer readable storage medium and/or system having instructions stored thereon. The instructions, when executed by computer processor hardware, cause the computer processor hardware (such as one or more co-located or disparately located processor devices) to control operation of any of the partial power converters as discussed herein.

Other implementations of the present disclosure include software programs and/or respective hardware to perform any of the method implementation steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of power supplies. However, it should be noted that implementations herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of implementations herein (BRIEF DESCRIPTION) purposefully does not specify every implementation and/or incrementally novel aspect of the present disclosure or claimed invention (s). Instead, this brief description only presents general implementations and corresponding points of novelty over conventional techniques. For additional details and/or possible perspectives (permutations) of the invention(s), the reader is directed to the Detailed Description section (which is a summary of implementations) and corresponding figures of the present disclosure as further discussed below.

BRIEF DESCRIPTION OF THE DRAWINGS

FIGS. 4A, 4B, 4C, 4D, and 4E are example timing diagrams of a power converter.

Figure 1:
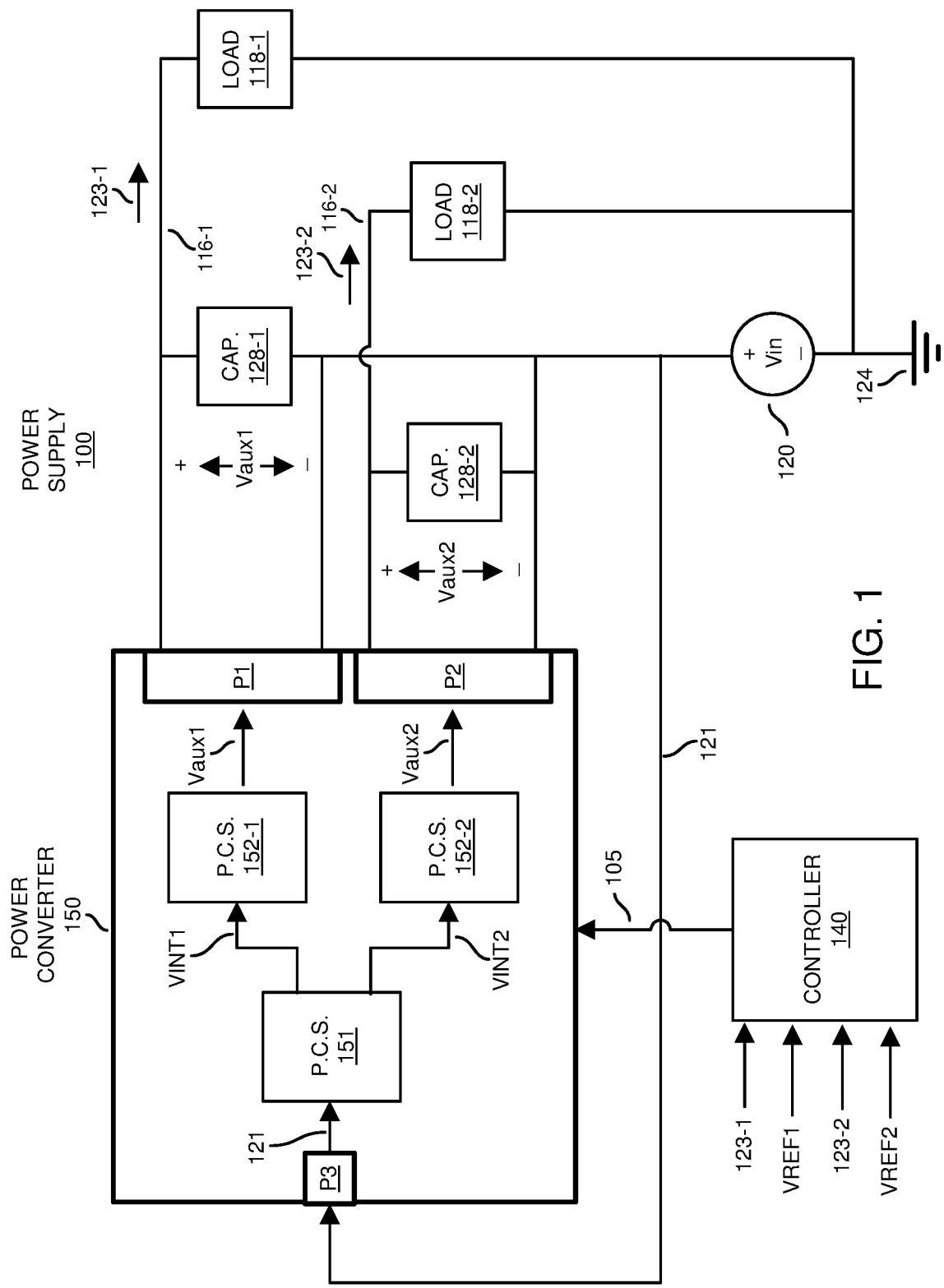
FIG. 1 is an example general diagram of a power converter and generation of multiple output voltages to power multiple loads.

The foregoing and other objects, features, and advantages of the invention will be apparent from the following more particular description of preferred implementations herein, as illustrated in the accompanying drawings in which like reference characters refer to the same parts throughout the different views. The drawings are not necessarily to scale, with emphasis instead being placed upon illustrating the implementations, principles, concepts, etc.

DETAILED DESCRIPTION

An implementation of a first partial power converter is configured to produce multiple output voltages from an input voltage. For example, the first partial power converter receives an input voltage. The first partial power converter converts the input voltage into multiple auxiliary voltages including a first auxiliary voltage and a second auxiliary voltage. The first partial power converter produces a first output voltage as a first summation of the first auxiliary voltage and the input voltage; the first partial power converter produces a second output voltage as a second summation of the second auxiliary voltage and the input voltage.

In another implementation, a second partial power converter receives a first auxiliary input voltage; the first auxiliary input voltage is referenced with respect to an output voltage of the power converter. The power converter also receives a second auxiliary input voltage; the second auxiliary input voltage is referenced with respect to the output voltage. The power converter converts the first auxiliary input voltage and the second auxiliary input voltage into the output voltage to power a load.

Note that this disclosure further includes the observation that, when output voltages need to be supplied to two or more loads, conventional systems of employing a standard partial power converter per each load results in a power supply having a higher bill of material cost and lower total power density. Split partial power conversion as discussed herein addresses the shortcomings of conventional duplicative systems. For example, the split partial power conversion as described solves the aforementioned issues by implementing a single split (integrated) partial power converter to provide multiple auxiliary voltages in which to power respective loads.

The value proposition of the split partial power converter as described herein lies in the fact that, as opposed to implementing multiple separately operating partial power converters, a single partial power converter having multiple secondary sides produces multiple different voltages that power multiple different loads. This results in a lower cost partial power converter circuit and higher power density, while retaining all of the benefits of implementing partial power conversion to power each of the loads.

The partial power converter as described herein provides one or more of the following benefits:

Ultra-high efficiency due to partial power conversion
Lower voltage ratings of the semiconductor devices compared to conventional solutions
Soft-switching
Bidirectionality power flow capability
Buck-like dynamic without right half plane zero for fastest response
Supply multiple loads from one source
Supply one load from multiple sources Now, more specifically, FIG. 1 is an example general diagram of a power converter and generation of multiple output voltages to power multiple loads.

In this example implementation, the power supply 100 includes controller 140, input voltage source 120 (such as battery assembly, battery backup system, power supply, or other suitable entity), bidirectional partial power converter 150 (such as a bidirectional split partial power converter), capacitor 128-1, and capacitor 128-2.

The bidirectional power converter 150 may include multiple power converter stages such as power converter stage 151 and power converter stage 152. In one implementation, the power converter stage 152 includes power converter stage 152-1 and power converter stage 152-2.

Additionally, the bidirectional partial power converter 150 includes multiple ports P1, P2, and P3. Port P3 receives input voltage 121 from the input voltage source 120. The port P1 outputs auxiliary voltage Vaux1 (such as a DC voltage); the port P2 outputs auxiliary voltage Vaux2 (such as a DC voltage).

In one implementation, the port P3 of the bidirectional partial power converter 150 receives the input voltage 121 from the input voltage source 120. The bidirectional partial power converter 150 converts the input voltage 121 into multiple auxiliary voltages including a first auxiliary voltage Vaux1 (such as differential voltage whose negative voltage potential is referenced with respect to the positive voltage potential of the input voltage source 120) and a second auxiliary voltage Vaux2 (such as differential voltage whose negative voltage potential is referenced with respect to the positive voltage potential of the input voltage source 120). The negative terminal of the input voltage source may be connected to the reference potential (voltage) 124.

The bidirectional partial power converter 150 produces a first output voltage 123-1 as a first summation of the first auxiliary voltage Vaux1 and the input voltage 120. For example, the capacitor 128-1 is connected in series with the input voltage source 120. The capacitor 128-1 stores the auxiliary voltage Vaux1. Thus, the first auxiliary voltage Vaux1 is offset or referenced with respect to the input voltage 121. The output voltage 123-1 outputted from port P1 (i.e., summation of the input voltage 121 and the auxiliary voltage Vaux1) powers load 118-1.

The bidirectional partial power converter 150 produces a second output voltage 123-2 as a second summation of the second auxiliary voltage Vaux2 and the input voltage 120. For example, the capacitor 128-2 is connected in series with the input voltage source 120. The capacitor 128-2 stores the auxiliary voltage Vaux2. Thus, the first auxiliary voltage Vaux2 is offset or referenced with respect to the input voltage 121. The output voltage 123-2 outputted from port P2 (i.e., summation of the input voltage 121 and the auxiliary voltage Vaux1) powers load 118-2.

Note that the bidirectional power converter 150 can include any number of power converter stages. In one implementation, the bidirectional partial power converter 150 includes a first power converter stage 151 and a second power converter stage 152. The power converter stage 151 can be configured to convert the received input voltage 121 from port P3 into multiple intermediate voltages such as intermediate voltage VINT1 and intermediate voltage VINT2 (see FIG. 2).

Referring again to FIG. 1, the second power converter stage 152 includes two or more instances of power converter circuitry or power converter stages to convert a respective intermediate voltage into an auxiliary voltage outputted from the bidirectional partial power converter 150.

For example, the second power converter stage 152 may include power converter circuitry 152-1 to convert the intermediate voltage VINT1 into the auxiliary voltage Vaux1 outputted from the port P1 and stored in the capacitor 128-1. The second power converter stage 152 may include power converter circuitry 152-2 to convert the intermediate voltage VINT2 into the auxiliary voltage Vaux2 outputted from the port P2 and stored in the capacitor 128-2.

The controller 140 may regulate the magnitude of the output voltage 123-1 and the magnitude of the output voltage 123-2 to be the same or different values.

For example, the controller 140 receives setpoint reference voltage VREF1 and setpoint reference VREF2. The controller 140 controls conversion of the intermediate voltage VINT1 based on a comparison of the magnitude of the output voltage 123-1 and the setpoint reference voltage VREF1 to regulate the magnitude of the output voltage 123-1. Similarly, the controller 140 controls conversion of the intermediate voltage VINT2 based on a comparison of the magnitude of the output voltage 123-2 and the setpoint reference voltage VREF2 to regulate the magnitude of the output voltage 123-2.

As its name suggests, the bidirectional partial power converter 150 can be configured to operate in different modes. For example, in a first mode, assuming that the regulated magnitude of the output voltages 123-1 and 123-2 are both greater in magnitude than the magnitude of the input voltage 121 (Vaux1 and Vaux2 are positive), the bidirectional partial power converter 150 is configured to receive power from the port P3 (via the input voltage 121) and output first power from the port P1 to produce the auxiliary voltage Vaux1 and output second power from the port P2 to produce the auxiliary voltage Vaux2. In such an instance, a combination of power from the input voltage 121 and the auxiliary voltage Vaux1 powers the load 118-1; a combination of power from the input voltage 121 and the auxiliary voltage Vaux2 powers the load 118-2.

Note that the bidirectional partial power converter 150 can be configured to switch between: i) a first mode of outputting the first output voltage Vaux1 from a first port P1 of the power converter and outputting the second output voltage Vaux2 from a second port P2 of the power converter, and ii) a second mode of charging the power source (input voltage source 120) based on a first charge voltage received from the first port P1 and/or a second charge voltage received from the second port P2.

Additionally, as further discussed herein, note that the auxiliary voltage Vaux1 and auxiliary voltage Vaux2 may have different polarities. For example, one auxiliary voltage may be positive and the other auxiliary voltage may be negative.

As a more specific example, assume that the output voltage 123-1 is regulated at a magnitude that is greater than the magnitude of the input voltage 121. In such an instance, the auxiliary voltage Vaux1 is positive. Conversely, also assume that the magnitude of the input voltage 121 is greater than a magnitude of the output voltage 123-2. In such an instance, the auxiliary voltage Vaux2 is negative. In this example, the bidirectional partial power converter 150 outputs power through port P1 via generation of the auxiliary voltage Vaux1. Because the auxiliary voltage Vaux2 is negative, the port P2 of the bidirectional partial power converter 150 receives power from the input voltage source 120. In one implementation, the power received from port P2 and/or power converter stage 152-2 of the bidirectional partial power converter 150 is conveyed (such as through the power converter stage 151 or power converter stage 152-2 to the power converter stage 152-1) and used by the power converter stage 152-1 to produce the auxiliary voltage Vaux1. If more power is needed to produce the auxiliary voltage Vaux1 than as received from the power converter stage 152-2 and corresponding port P2 associated with Vaux2, the power converter stage 152-1 receives such extra power from the port P3 and the power converter stage 151 via the input voltage 121.

Note that, regardless of the respective polarity of the two auxiliary voltages, the current from auxiliary voltage Vaux1 or Vaux2 is never fed back into the battery (input voltage source 120 while in the discharge mode. For example, such current flows from port P3 to the input node and it sums up to the current provided by the battery to build the summation of the output currents such that, by looking at FIG. 5, Iin+ΔI=I_(load,1)I_(load,2).

Thus, the bidirectional partial power converter 150 (such as a multiple port power system) supports advantageous multiple-directional flow or shifting of power amongst the ports P1, P2, and P3 to provide power to each of the loads 118 as well as potentially charge the input voltage source 120.

Figure 2:
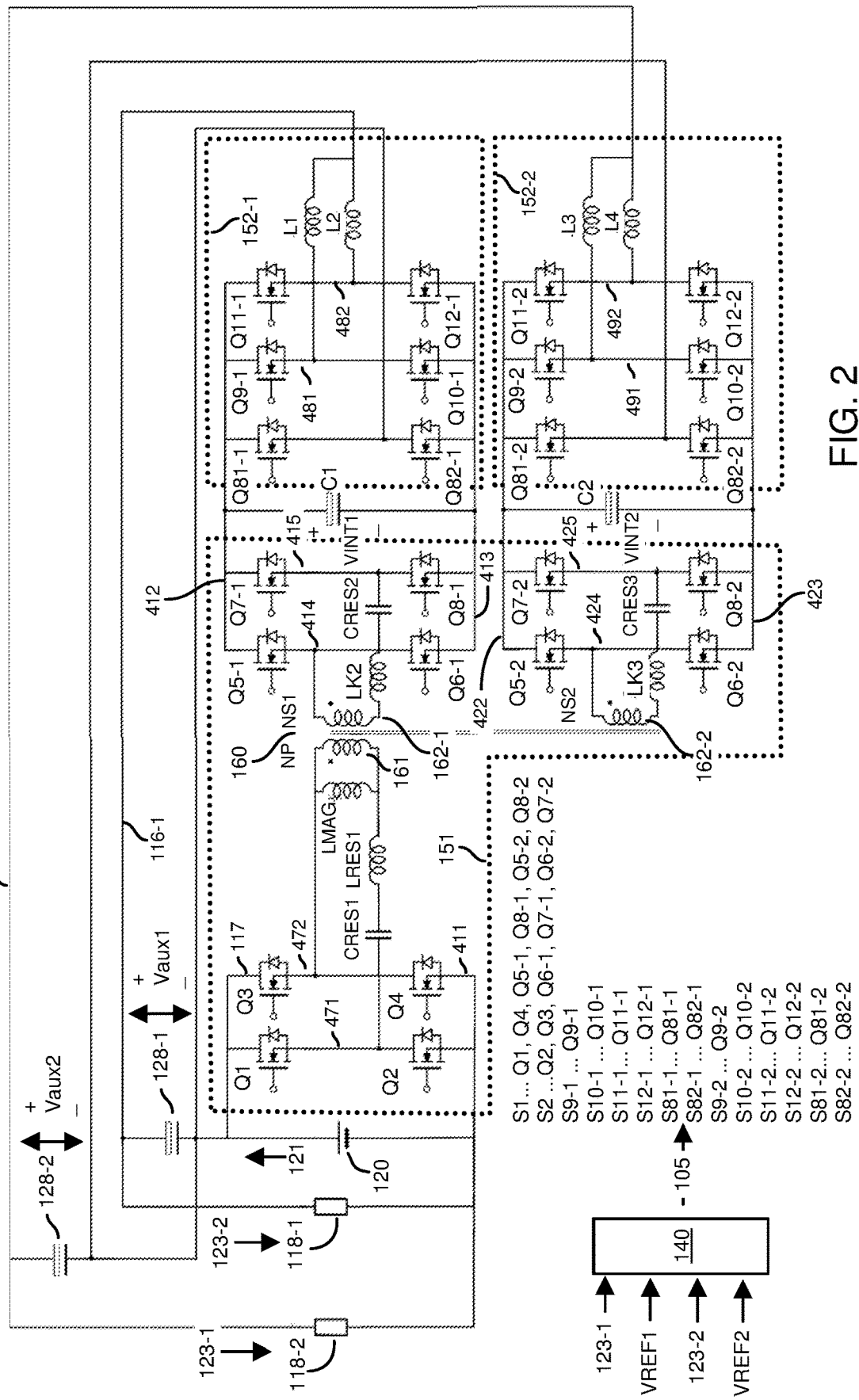
FIG. 2 is an example detailed circuit diagram of a power converter and generation of multiple output voltages to power multiple loads.

A more specific implementation of the bidirectional partial power converter 150 is shown in FIG. 2.

FIG. 2 is an example detailed circuit diagram of a power converter and generation of multiple output voltages to power multiple loads.

As previously discussed, the bidirectional partial power converter 150 includes power converter stage 151 coupled to the power converter stage 152 (such as power converter stage 152-1 and power converter stage 152-2) outputs two auxiliary voltages Vaux1 and Vaux2, which are stacked on top of the input voltage 121 to respectively produce output voltage 123-1 and output voltage 123-2. Note that the power converter stages 151 and 152 can be replaced with any suitable one or more suitable power converters.

As further shown, the power converter stage 151 of the bidirectional power converter 150 may include switches Q1, Q2, Q3, Q4, Q5-1, Q6-1, Q7-1, Q8-1, Q5-2, Q6-2, Q7-2, Q8-2. Additionally, the power converter stage 151 includes capacitor CRES1, inductor LRES1, and transformer 160.

Controller 140 produces control signals 105 (such as S1, S2, S9-1, S10-1, S11-1, S12-1, S81-1, S82-1, S9-2, S10-2, S11-2, S12-2, S81-2, and S82-2.

Control signal S1 drives gates of switches Q1, Q4, Q5-1, Q8-1, Q5-2, and Q8-2.

Control signal S2 drives gates of switches Q2, Q3, Q6-1, Q7-1, Q6-2, and Q7-2.

Control signal S9-1 drives a gate of switch Q9-1.
Control signal S10-1 drives the gate of switch Q10-1.
Control signal S11-1 drives the gate of switch Q11-1.
Control signal S12-1 drives the gate of switch Q12-1.
Control signal S81-1 drives the gate of switch Q81-1.
Control signal S82-1 drives the gate of switch Q82-1.
Control signal S9-2 drives a gate of switch Q9-2.
Control signal S10-2 drives the gate of switch Q10-2.
Control signal S11-2 drives the gate of switch Q11-2.
Control signal S12-2 drives the gate of switch Q12-2.
Control signal S81-2 drives the gate of switch Q81-2.
Control signal S82-2 drives the gate of switch Q82-2.

Figure 3A:
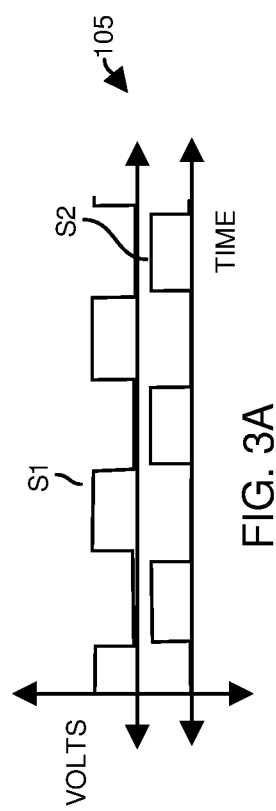
FIGS. 3A and 3B are example timing diagrams illustrating signals associated with a power converter.
Figure 3B:
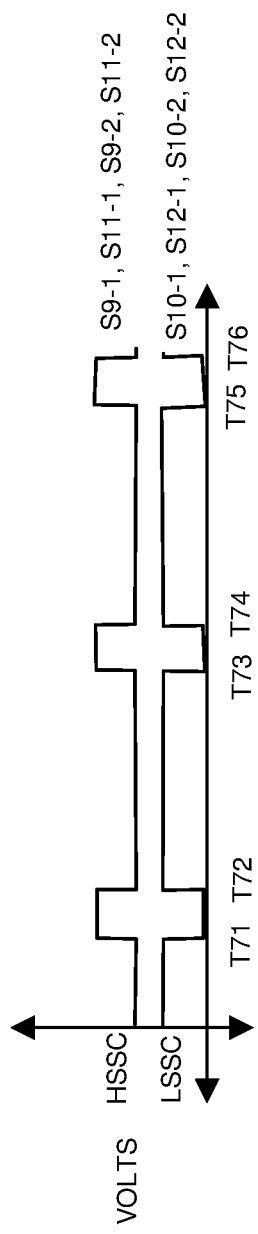

FIG. 3A illustrates an example of producing signals to drive switches in the power converter stage 151; FIG. 3B illustrates an example of producing signals to drive switches in the power converter stages 152-1 and 152-2.

Referring again to FIG. 2, transformer 160 of the power converter stage 151 includes primary winding 161 magnetically coupled to first secondary winding 162-1 and second secondary winding 162-2. If desired, note that the transformer 160 can be implemented as two separate transformers; primary winding 161 can be split as two primary windings in parallel in which one primary winding magnetically coupled to the secondary winding 162-1, the other primary winding magnetically coupled to the secondary winding 162-2. Thus, DC primary side winding 161 of transformer 160 is shared between the two secondary side windings 162-1 and 162-2. The inductance LMAG represents the magnetization inductance of the primary winding 161; the inductance LK2 represents the leakage inductance associated with winding 162-1; the inductance LK3 represents the leakage inductance associated with winding 162-2.

As further shown, switch Q1 and switch Q2 are connected in series between the node 117 and node 411. More specifically, the drain node of switch Q1 is connected to the node 117; the source node of switch Q1 is connected to the drain node of switch Q2 at node 471; the source node of switch Q2 is connected to the ground reference node 411.

Switch Q3 and switch Q4 are connected in series between the node 117 and node 411. More specifically, the drain node of switch Q3 is connected to the node 117; the source node of switch Q3 is connected to the drain node of switch Q4 at node 472; the source node of switch Q4 is connected to the ground reference node 411.

The series resonant circuit path including capacitor CRES1, inductor LRES1, and the primary winding 161 are connected between node 471 and node 472. Resonance of the series resonant circuit path during operation resulting conveyance of energy from the input voltage source 120 to the primary winding 161. The primary winding 161 transfers respective energy to the secondary winding 162-1 and secondary winding 162-2.

As further shown, switch Q5-1 and switch Q6-1 are connected in series between the node 412 and node 413. More specifically, the drain node of switch Q5-1 is connected to the node 412; the source node of switch Q5-1 is connected to the drain node of switch Q6-1 at node 414; the source node of switch Q6-1 is connected to the node 413 (such as an isolated reference potential). Switch Q7-1 and switch Q8-1 are connected in series between the node 412 and node 413. More specifically, the drain node of switch Q7-1 is connected to the node 412; the source node of switch Q7-1 is connected to the drain node of switch Q8-1 at node 415; the source node of switch Q8-1 is connected to the node 413 (such as an isolated reference potential).

A series combination of the secondary winding 162-1 and capacitor CRES2 are connected between node 414 and node 415.

Capacitor C1 (storing intermediate voltage VINT1) is connected between node 412 and node 413.

As further shown, switch Q5-2 and switch Q6-2 are connected in series between the node 422 and node 423. More specifically, the drain node of switch Q5-2 is connected to the node 422; the source node of switch Q5-2 is connected to the drain node of switch Q6-2 at node 424; the source node of switch Q6-2 is connected to the node 423 (such as an isolated reference potential). Switch Q7-2 and switch Q8-2 are connected in series between the node 422 and node 423. More specifically, the drain node of switch Q7-2 is connected to the node 422; the source node of switch Q7-2 is connected to the drain node of switch Q8-2 at node 425; the source node of switch Q8-2 is connected to the node 413 (such as an isolated reference potential).

A series combination of the secondary winding 162-2 and capacitor CRES3 are connected between node 424 and node 425.

Capacitor C2 (storing intermediate voltage VINT2) is connected between node 432 and node 433.

As previously discussed, the controller 140 produces signals S1 and S2. Control signal S1 is inputted to the gate nodes of switches Q1, Q4, Q5-1, Q5-2, Q8-1 and Q8-2. Control signal S2 is inputted to the gates of switches Q2, Q3, Q6-1, Q6-2, Q7-1, and Q7-2.

The components including switches Q1, Q2, Q3, and Q4, capacitor CRES1, inductor LRES1, and primary winding 161 represent a primary side circuit with respect to the transformer 160. The components including switches Q5-1, Q6-1, Q7-1, and Q8-1, capacitor CRES2, and secondary winding 162-1 represent a first secondary side circuit with respect to the transformer 160. The components including switches Q5-2, Q6-2, Q7-2, and Q8-2, capacitor CRES3, and secondary winding 162-2 represent a second secondary side circuit with respect to the transformer 160.

Switching operation of the power converter stage 151 and conversion of the input voltage 121 into the intermediate voltage VINT1 (such as a DC voltage) and intermediate voltage VINT2 (such as a DC voltage) is achieved via switching as shown in FIG. 3A. For example, via switching of respective switches in the power converter stage 151, presence of the series resonant circuit (CRES1, LRES1, primary winding 161) on the primary side circuit of power converter stage 151 and the presence of the series resonant circuit (secondary winding 162-1 and CRES2) on the first secondary side circuit of power converter stage 151 results in resonance on both sides of the transformer windings and generation of the intermediate voltage VINT1. Additionally, via switching of respective switches in the power converter stage 151, presence of the series resonant circuit (CRES1, LRES1, primary winding 161) on the primary side circuit of power converter stage 151 and the presence of the second series resonant circuit (secondary winding 162-2 and CRES3) on the secondary side circuit of power converter stage 151 results in resonance on both sides of the transformer windings and generation of the intermediate voltage VINT2.

Referring again to FIG. 2, as further shown, the power converter stage 152-1 of the bidirectional power converter 150 includes switches Q9-1, Q10-1, Q11-1, and Q12-1. The power converter stage 152-1 also includes so-called totem pole circuit Q81-1 and Q81-2 (a.k.a., a voltage polarity control circuit) to control a polarity of the auxiliary voltage Vaux1. Additionally, the power converter stage 152-1 includes inductor L1 and inductor L2. Thus, power converter stage 152-1 can be configured as one or more buck converters.

As further shown, switch Q9-1 and switch Q10-1 are connected in series between the node 412 and node 413. More specifically, the drain node of switch Q9-1 is connected to the node 412; the source node of switch Q9-1 is connected to the drain node of switch Q10-1 at node 481; the source node of switch Q10-1 is connected to the node 413.

Switch Q11-1 and switch Q12-1 are connected in series between the node 412 and node 413. More specifically, the drain node of switch Q11-1 is connected to the node 412; the source node of switch Q11-1 is connected to the drain node of switch Q12-1 at node 482; the source node of switch Q12-1 is connected to the node 413.

The power converter stage 152-2 of the bidirectional power converter 150 includes switches Q9-2, Q10-2, Q11-2, and Q12-2. The power converter stage 152-2 also includes totem pole circuit Q81-2 and Q82-2 (voltage polarity control circuit) to control a polarity of the auxiliary voltage Vaux2. Additionally, the power converter stage 152-2 includes inductor L3 and inductor L4. Thus, power converter stage can be configured as a buck converter.

As further shown, switch Q9-2 and switch Q10-2 are connected in series between the node 422 and node 423. More specifically, the drain node of switch Q9-2 is connected to the node 422; the source node of switch Q9-2 is connected to the drain node of switch Q10-2 at node 491; the source node of switch Q10-2 is connected to the node 423.

Switch Q11-2 and switch Q12-2 are connected in series between the node 422 and node 423. More specifically, the drain node of switch Q11-2 is connected to the node 422; the source node of switch Q11-2 is connected to the drain node of switch Q12-2 at node 492; the source node of switch Q12-2 is connected to the node 423.

Inductor L1 of the power converter stage 152-1 is connected between node 481 and node 116; inductor L2 is connected between node 482 and node 116-1. Thus, power converter stage 152-1 includes multiple buck converters in parallel. The power converter stage 152-1 can include any number of buck converter phases to convert the voltage VINT1 into the auxiliary voltage Vaux1.

Inductor L3 of the power converter stage 152-2 is connected between node 491 and node 116-2; inductor L4 is connected between node 492 and node 116-2. Thus, power converter stage 152-2 includes multiple buck converters in parallel. The power converter stage 152-2 can include any number of buck converter phases to convert the voltage VINT2 into the auxiliary voltage Vaux2.

Switching operation of the switches in the power converter stage 152-1 and 152-2 is shown in FIG. 3B. Referring again to FIG. 2, switching results in conversion of the intermediate voltage VINT1 into the auxiliary voltage VAUX1 and conversion of the intermediate voltage VINT2 into the auxiliary voltage VAUX2.

Thus, in one implementation, the partial power converter 150 includes: i) a primary side circuit (such as Q1-Q4, CRES1, LRES1, and winding 161) operative to receive the input voltage 121, the primary side circuit including a first resonant circuit such as LRES1, CRES1, and winding 161, ii) a first secondary side circuit including a first secondary winding 162-1 magnetically coupled to the primary side circuit and winding 161, the first secondary side circuit being a resonant circuit (including winding 162-1 and capacitor CRES2) operative to produce a first intermediate voltage VINT1 in which to produce the first auxiliary voltage VAUX1, and iii) a second secondary side circuit including a second secondary winding 162-2 magnetically coupled to the winding 161 of the primary side circuit, the second secondary side circuit being a resonant circuit (including winding 162-2 and capacitor CRESS) operative to produce a second intermediate voltage VINT2 in which to produce the second auxiliary voltage VAUX2.

Additionally, it is noted that the bidirectional partial power converter 150 is a split partial power converter including a first partial power converter circuit and a second partial power converter circuit. The first partial power converter circuit (such as Q1-Q4, CRES1, LRES1, winding 161, winding 162-1, Q5-1, Q6-1, Q7-1, Q8-1, capacitor C1, Q81-1, Q82-1, Q9-1, Q10-1, Q11-1, Q12-1, inductor L1, inductor L2 is operative to derive the first auxiliary voltage VAUX1 based at least in part from the input voltage 121. The second partial power converter circuit (such as Q1-Q4, CRES1, LRES1, winding 161, winding 162-2, Q5-2, Q6-2, Q7-2, Q8-2, capacitor C2, Q81-2, Q82-2, Q9-2, Q10-2, Q11-2, Q12-2, inductor L3, inductor L4 is operative to derive the second auxiliary voltage VAUX2 based at least in part from the input voltage 121. The first partial power converter circuit and the second partial power converter circuit are therefore partially integrated and share use of a first resonant circuit operative to receive the input voltage. In other words, both the first partial power converter circuit and the second partial power converter circuit as previously discussed share use of Q1-Q4, CRES1, LRES1, and winding 161.

Thus, a first implementation of the proposed power supply solution is shown in FIG. 2. For the sake of simplicity only two loads 118-1 and 118-2 are considered. However, the concept as discussed herein can be adapted to any suitable number of loads.

The converter depicted in FIG. 2 includes the cascade of a DCX, a totem pole (to provide negative or positive auxiliary voltages) and a buck converter with an arbitrary number of interleaved phases. It has to be highlighted that the first stage 151 can be any suitable isolated DC/DC converter.

The novelty of the power supply 100 and corresponding circuitry lies in the fact that multiple secondary sides (right hand side of transformer 160 in the power converter stage 151) plus the power converter stage 152-1 and power converter stage 152-2 provide unique voltage generation as discussed herein.

More specifically, in the example of FIG. 2, by means of a three winding transformer 160 the primary side of the DCX provides energy to two secondary sides each outputting an auxiliary voltage, namely Vaux1 and Vaux2 Such that:

the output voltage $123-1 = V_{in} + V_{aux1}$;

output voltage $123-2 = V_{in} + V_{aux2}$

The turns of the primary winding Np and of two secondary windings Ns1 and Ns2 can be freely chosen according to the needs of the application. Specifically Ns1 and Ns2 can be independently chosen. This way great flexibility is given to the designer who can tailor the secondary sides input voltages according to the required auxiliary voltages and accordingly select the semiconductor devices with optimal FOM.

In case additional flexibility is needed, as previously discussed, the three winding transformer 160 of the converter 150 in FIG. 2 can be also replaced with two separate transformers with the primary sides parallel connected, where corresponding windings can be selected according to the application needs. However having two separate transformers leads to a less dense and less cost-effective solution, making the circuit shown in FIG. 2 more desirable.

As previously discussed, presence of two additional resonant capacitors CRES2 and CRESS respectively on the first secondary side and on the second secondary side as previously discussed provides compensation for the leakage inductances Lk2 and Lk3 between the two secondary windings in order to keep smooth resonant waveforms as well as soft-switching capabilities.

The functionalities of the circuitry was proven by means of electrical simulations where the following parameters have been considered:

Input voltage linearly varying between 60V and 37V
DCX switching frequency S1 and S2: 530 kHz
Resonant inductors: 10 nH
Resonant capacitors: 6 μF
Magnetizing inductance: 4.91 μH
Transformer turn ratio 1:2:1
Transformer turn ratio 2:3:1
Middle capacitance C1: 160 μF
Buck Switching frequency 300 kHz
Buck inductors L1, L2, L3, and L4: 1.5 μH each
Auxiliary capacitances of capacitors 128-1 and 128-2: 5 μF
Output capacitances (such as across the loads): 680 μF
Output voltage 123-1 at 48 VDC at 3 kW
Output voltage 123-2 at 45V at 1 kW FIGS. 4A, 4B, 4C, 4D, and 4E are example timing diagrams illustrating signals associated with the bidirectional partial power converter.

In this implementation, assume that the solid lines are the waveforms relative to the first load 118-1 while the dashed curves are the waveforms relative to the second load 118-2.

As shown in these timing diagram the FIG. 4A, it is shown that the output voltage 123-1 and output voltage 123-2 are correctly regulated to the desired value 48 VDC and VDC. As previously discussed, the output voltage 123-1 is a summation of the input voltage 121 and the auxiliary voltage Vaux1; the output voltage 123-2 is a summation of the input voltage 121 and the auxiliary voltage Vaux2.

FIG. 4E indicates totem pole switch settings TP1 (low indicates to activate switch Q81-1 ON while Q82-1 is OFF; high indicates to activate switch Q82-1 ON while Q82-1 is OFF) and totem pole switch settings TP2 (low indicates to activate switch Q82-1 ON while Q82-2 is OFF; high indicates to activate switch Q82-2 ON while Q82-2 is OFF).

FIG. 4B indicates how magnitudes of the auxiliary voltages change over time as the magnitude of the input voltage 121 decreases.

The magnitude of the input voltage 121 decays or decreases over time as shown in FIG. 4C. Because the output voltages are regulated, the auxiliary voltages vary in magnitude. For example, prior to time T41, the magnitude of the input voltage is substantially greater than 48 VDC. This means that the power converter 150 produces, via proper settings TP1 and TP2 of the corresponding totem pole switches, the auxiliary voltage Vaux1 and Vaux2 to be negative values.

Between time T41 and T42, the magnitude of the input voltage 121 is substantially less than 48 VDC but greater than 44 volts DC. This means that the power converter 150 produces, via proper settings TP1 and TP2 of the corresponding totem pole switches, the auxiliary voltage Vaux1 is positive and Vaux2 is negative.

After time T42, the magnitude of the input voltage 121 is substantially less than 44 VDC. This means that the power converter 150 produces, via proper settings TP1 and TP2 of the corresponding totem pole switches, the auxiliary voltage Vaux1 and Vaux2 to be positive values.

Another interesting aspect of the MRPPC takes place when auxiliary voltages of opposite polarities have to be outputted. Indeed in this case, the DC value of the DCX input current is reduced (even down to 0) leading to lower loss in the primary side of the converter and therefore to higher efficiency. This happens because in such case at least part of the power is shuffled (transferred) from one power converter stage to another as previously discussed via the secondary windings of transformer 160.

Figure 5:
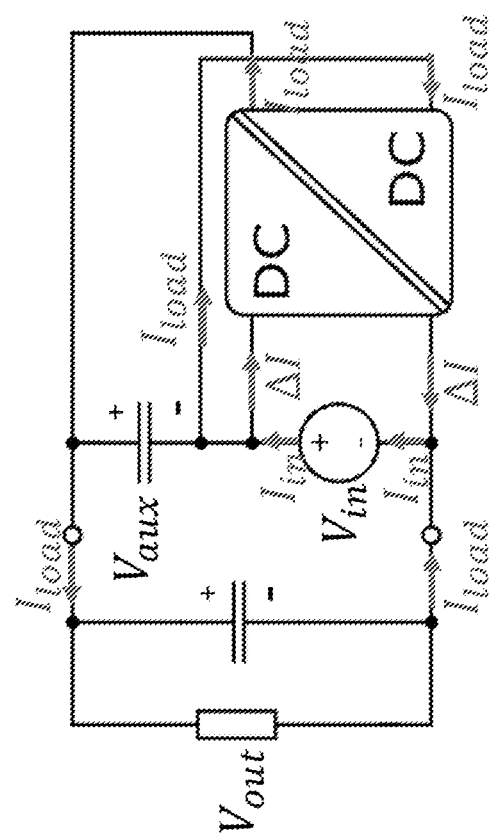
FIG. 5 is an example diagram illustrating distribution of currents and voltages in a partial power converter.

FIG. 5 is an example diagram illustrating distribution of currents and voltages in a partial power converter.

As shown in FIG. 5, in a standard partial power converter, the input current ΔI of the isolated DC/DC stage is given by the following equation:

$$\Delta I = I\_in - I\_load$$

Where:

$$I\_in = P\_load / V\_in$$

$$I\_load = P\_load / V\_load$$

If V_aux>0, this means that V_load>V_in and therefore that I_load<I_in and finally that ΔI>0

If V_aux<0, this means that V_load<V_in and therefore that I_load>I_in and finally that ΔI<0

In the converter shown in FIG. 2, where two loads are served by the converter, the input current of the DCX is given by the algebraic summation of the ΔI currents relative to each load and when the two loads require auxiliary voltages opposite in polarity such summation will lead to a reduced input current for the DCX.

Figure 6:
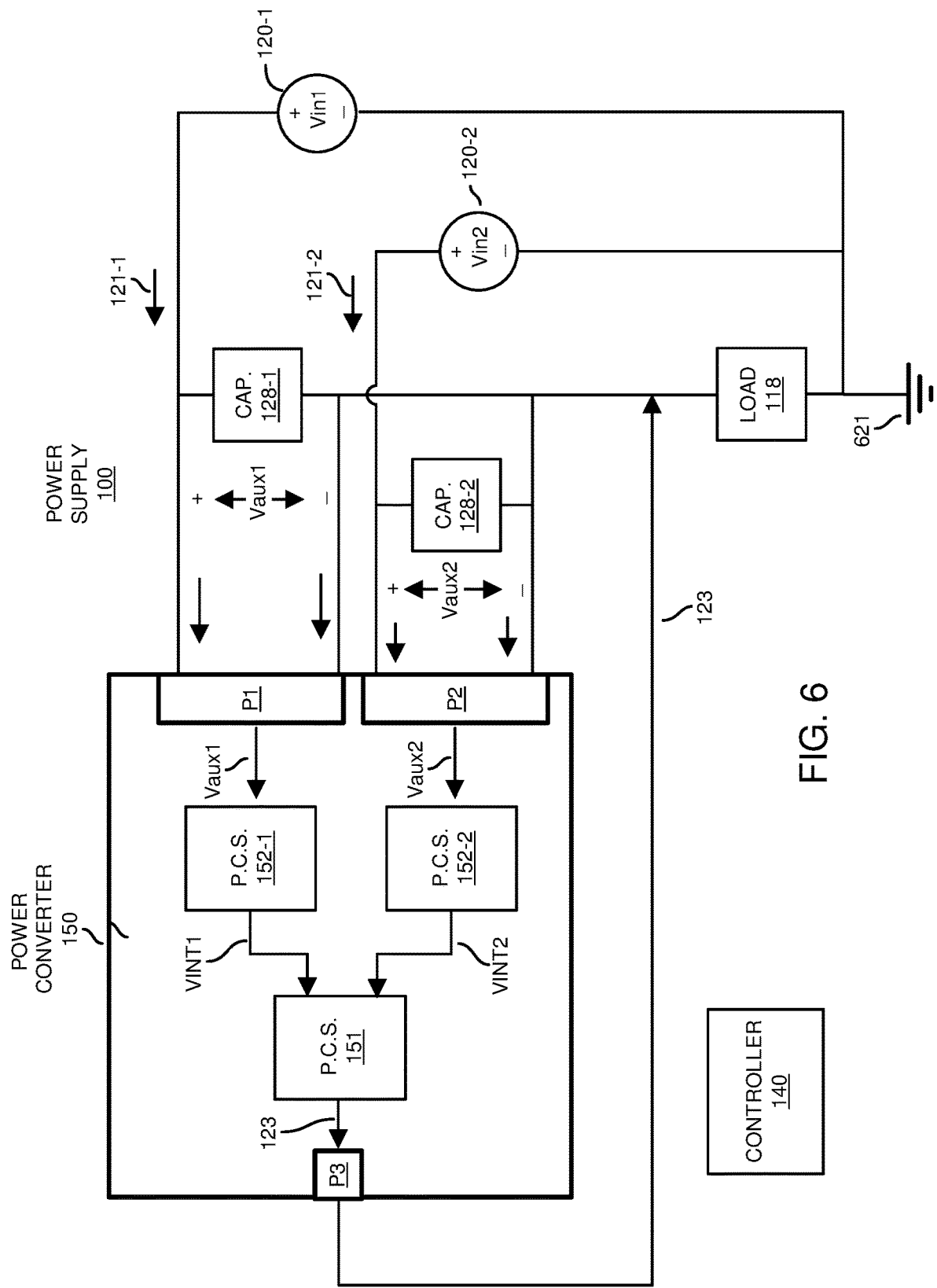
FIG. 6 is an example diagram illustrating a partial power converter generating an output voltage based on multiple input voltages.

FIG. 6 is an example diagram illustrating a partial power converter generating an output voltage based on multiple input voltages.

In this example implementation, the power supply 100 includes controller 140, input voltage source 120-1 (such as power source, battery assembly, battery backup system, power supply, or other suitable entity), input voltage source 120-2 (such as power supply, battery assembly, battery backup system, power supply, or other suitable entity), bidirectional partial power converter 150 (such as a bidirectional split partial power converter), capacitor 128-1, and capacitor 128-2.

As previously discussed, the bidirectional power converter 150 may include multiple power converter stages such as power converter stage 151 and power converter stage 152. In one implementation, the power converter stage 152 includes power converter stage 152-1 and power converter stage 152-2.

Additionally, the bidirectional partial power converter 150 includes multiple ports P1, P2, and P3. The port P1 receives auxiliary voltage Vaux1 (such as a DC voltage); the port P2 receives auxiliary voltage Vaux2 (such as a DC voltage).

In one implementation as shown, the first auxiliary input voltage VAUX1 is referenced with respect to output voltage 123 of the power converter 151. The second auxiliary input voltage VAUX2 is referenced with respect to the output voltage 123 as well. The bidirectional partial power converter 150 converts the first auxiliary input voltage VAUX1 and the second auxiliary input voltage VAUX2 into the output voltage 123 outputted from the port P3 to power the load 118.

In one implementation, the first auxiliary voltage VAUX1 is generated from a first voltage source 120-1 supplying a first input voltage 121-1 to port P1; a magnitude of the first input voltage 121-1 is a summation of the output voltage 123 and the first auxiliary voltage VAUX1 (such as voltage across capacitor 128-1). The second auxiliary voltage VAUX2 is generated from a second voltage source 120-2 supplying a second input voltage 121-2 to port P2; a magnitude of the second input voltage 121-2 is a summation of the output voltage 123 and the second auxiliary voltage VAUX2 (such as a voltage across capacitor 128-2).

Via the power converter stages 152-1 and 152-2 as well as power converter stage 151, the bidirectional partial power converter 150 produces output voltage 123 to power the load 118.

Note again that the bidirectional power converter 150 can include any number of power converter stages. In one implementation, the bidirectional partial power converter 150 includes a first power converter stage 151 and a second power converter stage 152. The power converter stage 152-1 is configured to convert the auxiliary voltage VAUX1 into the first intermediate voltage VINT1; the power converter stage 152-2 is configured to convert the auxiliary voltage VAUX2 into the first intermediate voltage VINT2. The power converter stage converts the combination of intermediate voltages VINT1 and VINT2 into the output voltage 123.

Note that the controller 140 may regulate the magnitude of the output voltage 123 to be a desired magnitude.

Figure 7:
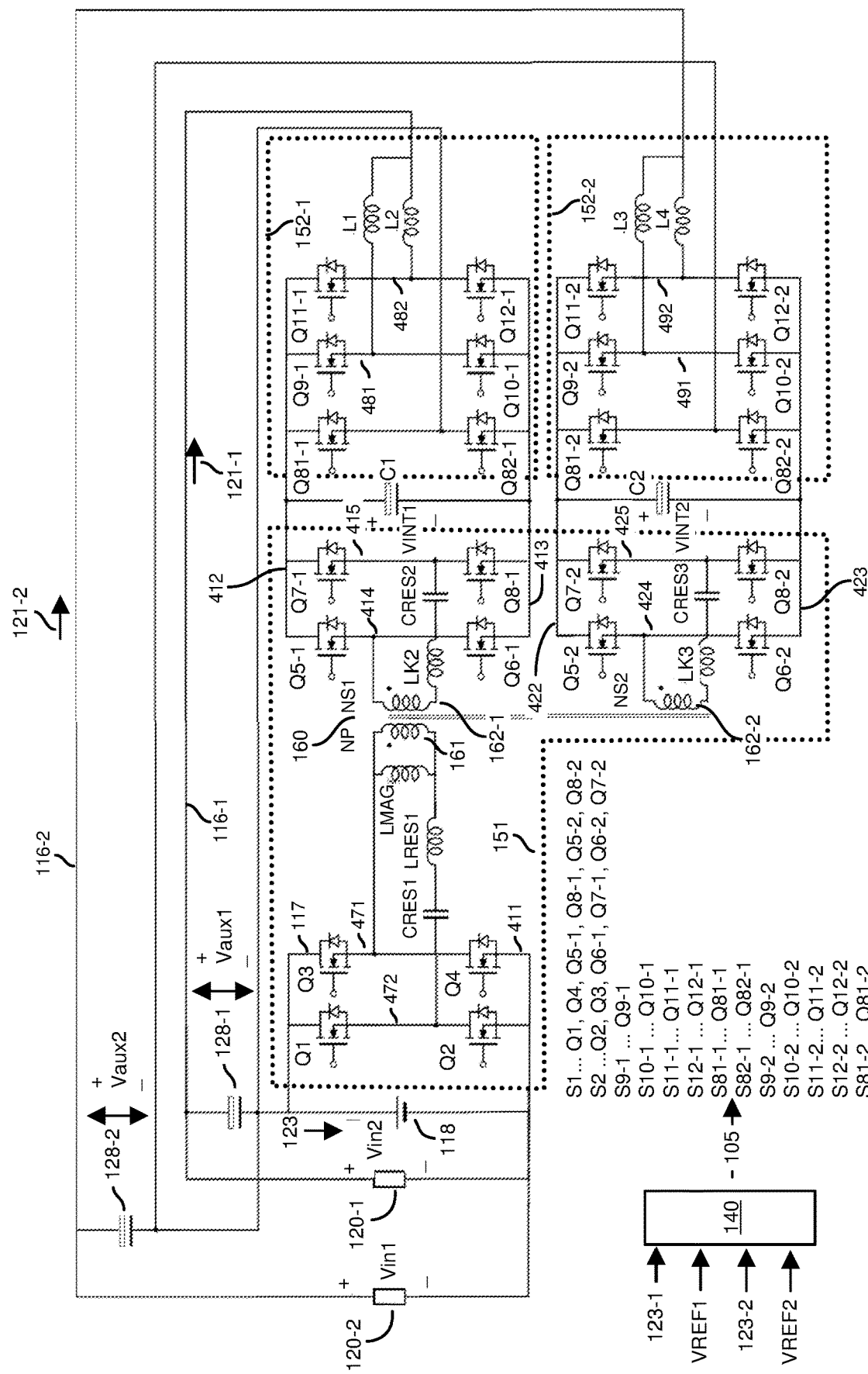
FIG. 7 is an example diagram illustrating more details of a partial power converter (similar to FIG. 2 but two loads and one input rather than two inputs and one load) generating an output voltage based on multiple input voltages.

FIG. 7 is an example diagram illustrating more details of a partial power converter generating an output voltage based on multiple input voltages.

In this example, the bidirectional partial power converter 150 works in a reverse direction than as previously discussed. For example, the power converter stage 152-1 receives the auxiliary voltage VAUX1 and converts it into the intermediate voltage VINT1 stored in capacitor C1. The power converter stage 152-2 receives the auxiliary voltage VAUX2 and converts it into the intermediate voltage VINT2 stored in capacitor C2. In one implementation, the controller 140 controls the power converter stages 152-1 and 152-2 to regulate the intermediate voltage VINT1 and VINT2 to desired magnitudes.

As further shown, operation of the resonant circuit including switches Q5-1, Q6-1, Q7-1, Q8-1, winding 162-1, and capacitor CRES2 causes energy received from the intermediate voltage VINT1 to flow to the winding 162-1; the energy transfers from the winding 162-1 to the winding 161 of the transformer 160. In a similar manner, operation of the resonant circuit including switches Q5-2, Q6-2, Q7-2, Q8-1, winding 162-2, and capacitor CRES3 causes energy received from the intermediate voltage VINT2 to flow to the winding 162-2 and transfer from the winding 162-2 to the winding 161 of the transformer 160.

As further shown, switching operation of switches Q1-Q4 and corresponding resonance of the resonant circuit including winding 161, inductor LRES1, and capacitor CRES1 causes energy received from the winding 161 to produce the output voltage 123 that powers the load 118.

FIGS. 8A, 8B, 8C, and 8D are example timing diagrams illustrating signals associated with a power converter.

Figure 8A:
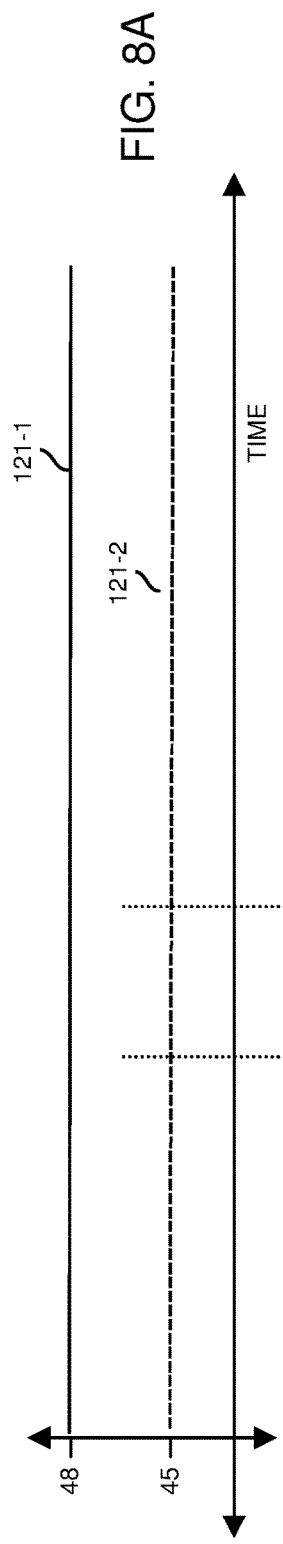
FIGS. 8A, 8B, 8C, and 8D are example timing diagrams illustrating signals associated with a power converter.

As shown in FIG. 8A, the input voltage 121-1 is around 48 VDC and the input voltage 121-2 is around 45 VDC.

Figure 8B:
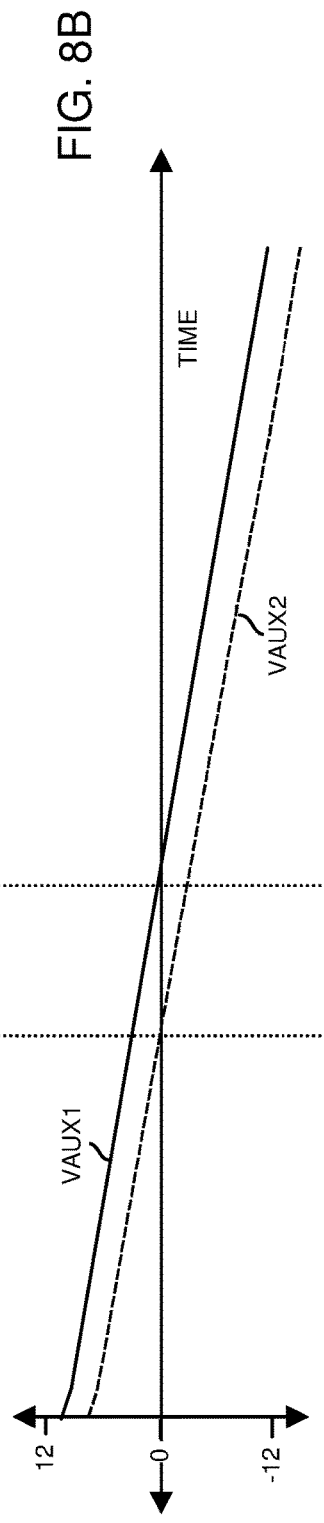
Figure 8C:

FIG. 8B indicates how magnitudes of the auxiliary voltages change over time as the magnitude of the output voltage 123 increases (FIG. 8C). The controller 140 switches a polarity of the totem pole switches for the power converter stage 152-1 at time T81. The controller 140 switches a polarity of the totem pole switches for the power converter stage 152-2 at time T82.

Figure 8D:
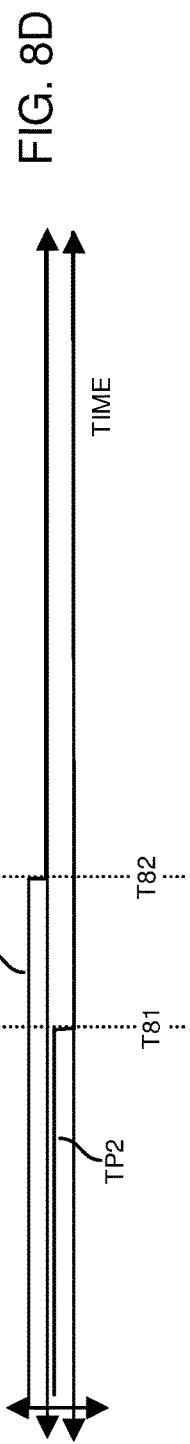

FIG. 8D illustrates control of the totem pole circuitry via TP1 and TP2 in each of the power converter stages 152-1 and 152-2 when the polarity of the respective auxiliary voltage reverses.

Figure 9:
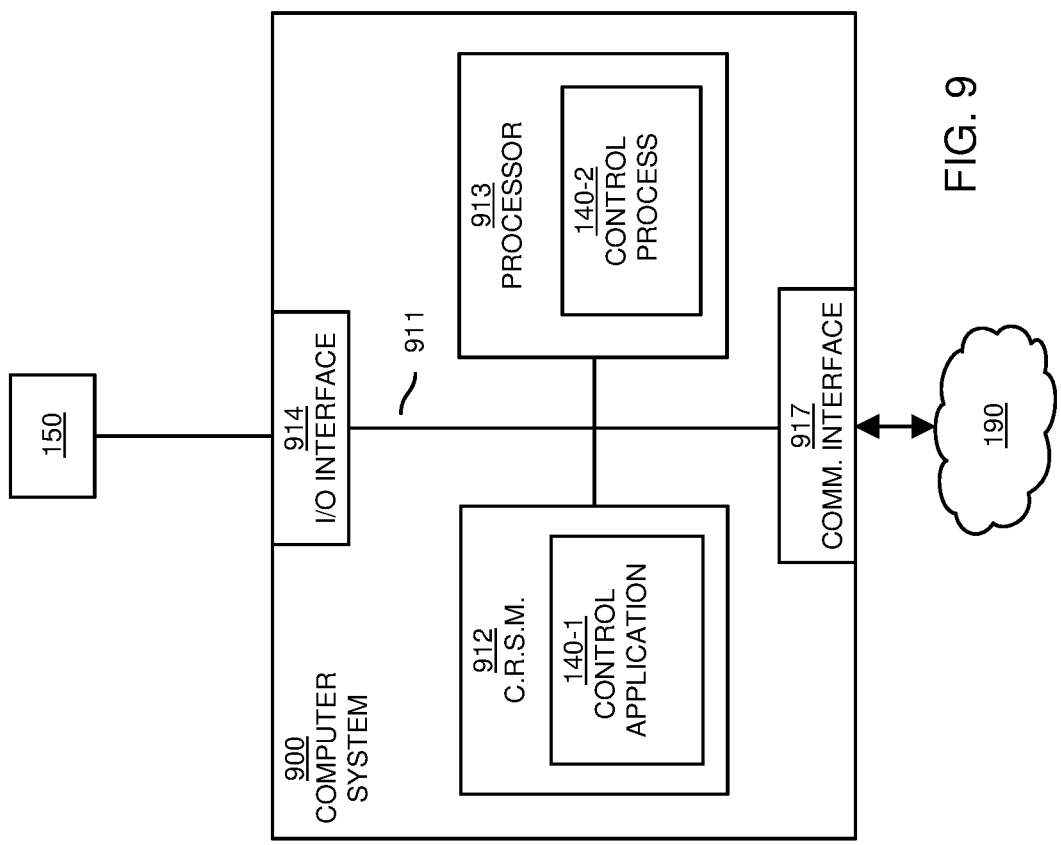
FIG. 9 is an example diagram illustrating computer processor hardware and related software instructions that execute control operations associated with power generation.

FIG. 9 is an example block diagram of a computer device for implementing any of the operations as discussed herein according to implementations herein.

As shown, computer system 900 (such as implemented by any of one or more resources such as controller 140, bidirectional power converter 150, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914 (e.g., to output control signals to the power converter phases, monitor current, etc.), and a communications interface 917.

I/O interface 914 provides connectivity to any suitable circuitry such as power supply 100 and corresponding power converter circuitry.

Computer readable storage medium 912 can be any hardware storage resource or device such as memory, optical storage, hard drive, floppy disk, etc. In one implementation, the computer readable storage medium 912 stores instructions and/or data used by the controller application 140-1 to perform any of the operations as described herein.

Further in this example implementation, communications interface 917 enables the computer system 900 and processor 913 to communicate over a resource such as network 190 to retrieve information from remote sources and communicate with other computers.

As shown, computer readable storage media 912 (such as computer-readable storage hardware) is encoded with controller application 140-1 (e.g., software, firmware, etc.) executed by processor 913. Controller application 140-1 can be configured to include instructions to implement any of the operations as discussed herein.

During operation of one implementation, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different implementations, note that computer system 900 can be a micro-controller device, logic, hardware processor, hybrid analog/digital circuitry, etc., configured to control a power supply and perform any of the operations as described herein.

Functionality supported by the different resources will now be discussed via flowcharts in FIG. 10 and FIG. 11. Note that the steps in the flowcharts below can be executed in any suitable order.

Figure 10:
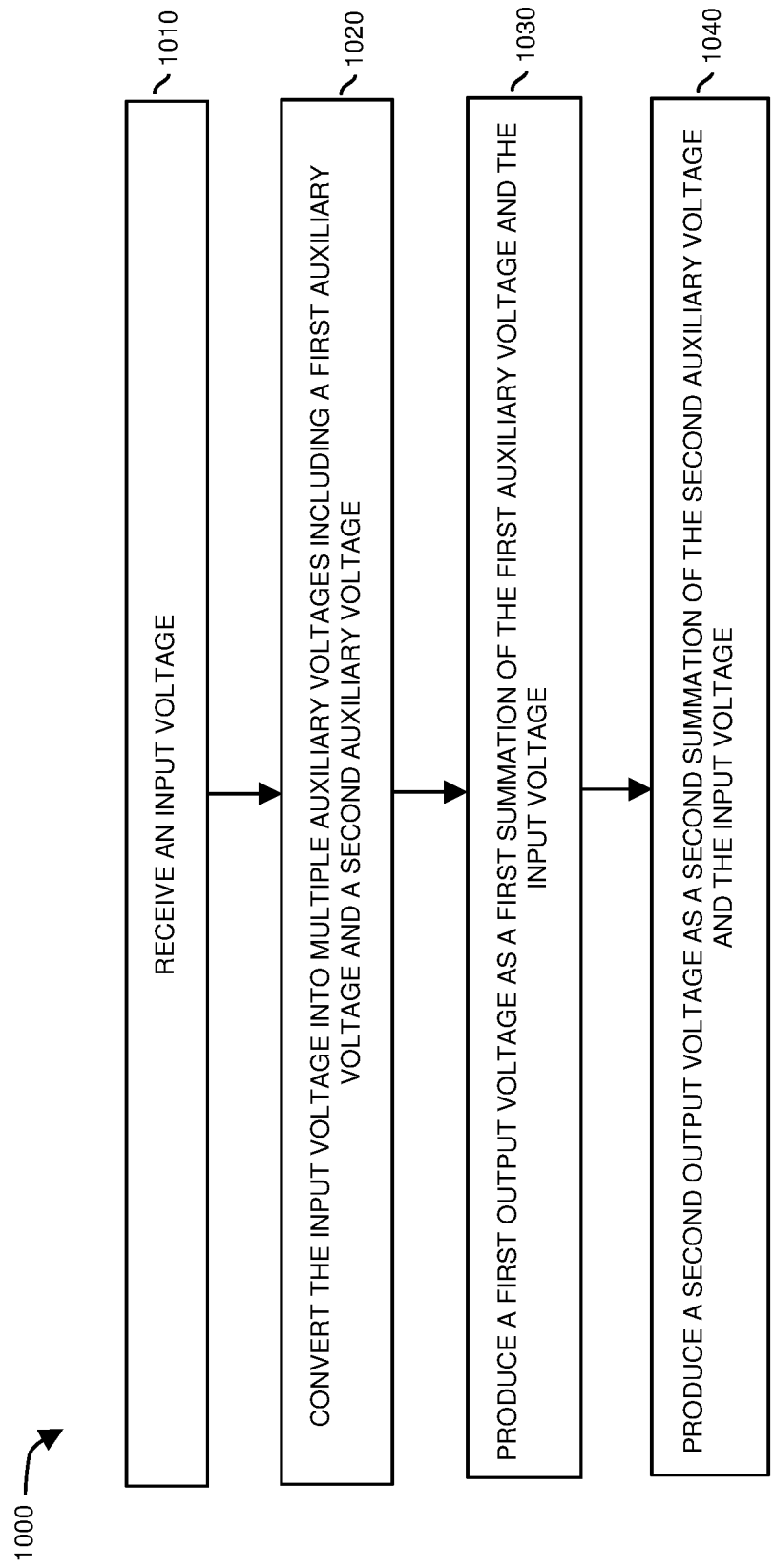
FIG. 10 is an example diagram illustrating a method of operating a power converter to generate multiple output voltages based on an input voltage.

FIG. 10 is an example diagram illustrating a method of controlling a power converter according to implementations herein.

In processing operation 1010, the power converter 150 receives an input voltage.

In processing operation 1020, the power converter 150 converts the input voltage into multiple auxiliary voltages including a first auxiliary voltage and a second auxiliary voltage.

In processing operation 1030, the power converter 150 produces a first output voltage as a first summation of the first auxiliary voltage and the input voltage.

In processing operation 1040, the power converter 150 produces a second output voltage as a second summation of the second auxiliary voltage and the input voltage.

Figure 11:
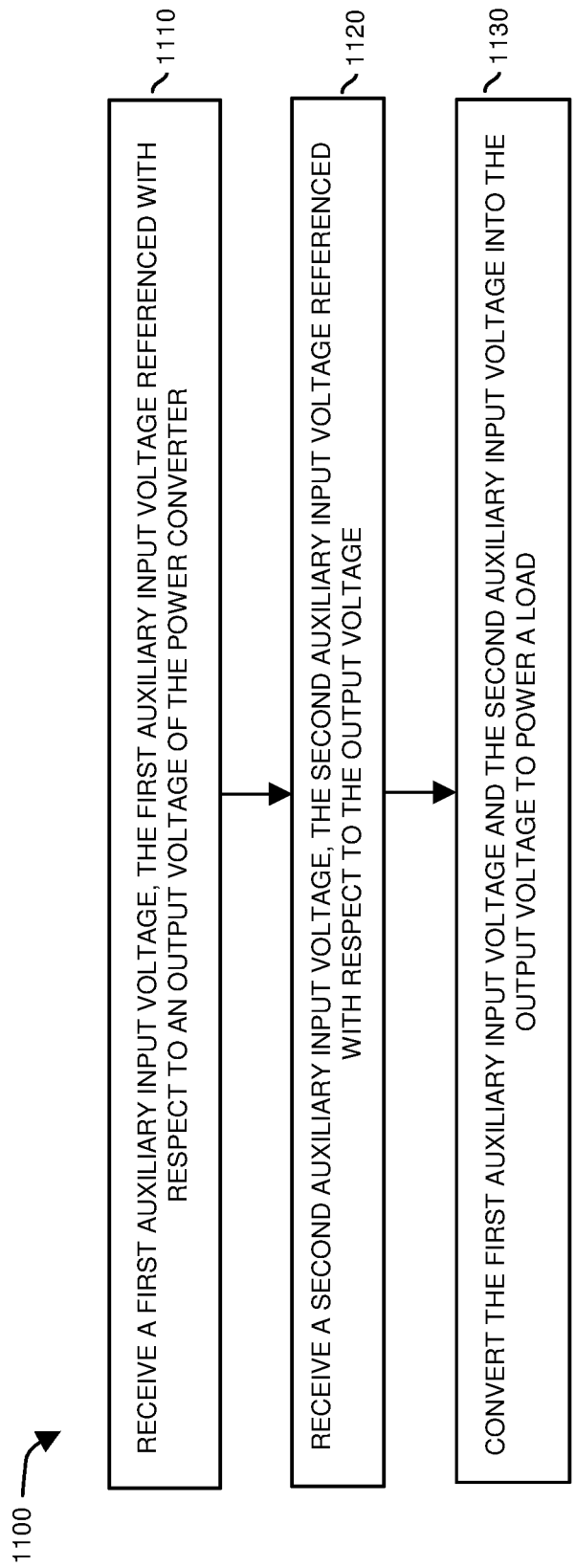
FIG. 11 is an example diagram illustrating a method of operating a power converter to receive multiple input voltages and generate an output voltage.

FIG. 11 is an example diagram illustrating a method of controlling a power converter according to implementations herein.

In processing operation 1110, the power converter 150 receives a first auxiliary input voltage VAUX1; the first auxiliary input voltage VAUX1 is referenced with respect to an output voltage 123 of the power converter 150.

In processing operation 1120, the power converter 150 receives a second auxiliary input voltage VAUX2; the second auxiliary input voltage VAUX2 is referenced with respect to the output voltage 123.

In processing operation 1130, the power converter 150 converts the first auxiliary input voltage VAUX1 and the second auxiliary input voltage VAUX2 into the output voltage 123 to power a load 118.

Figure 12:
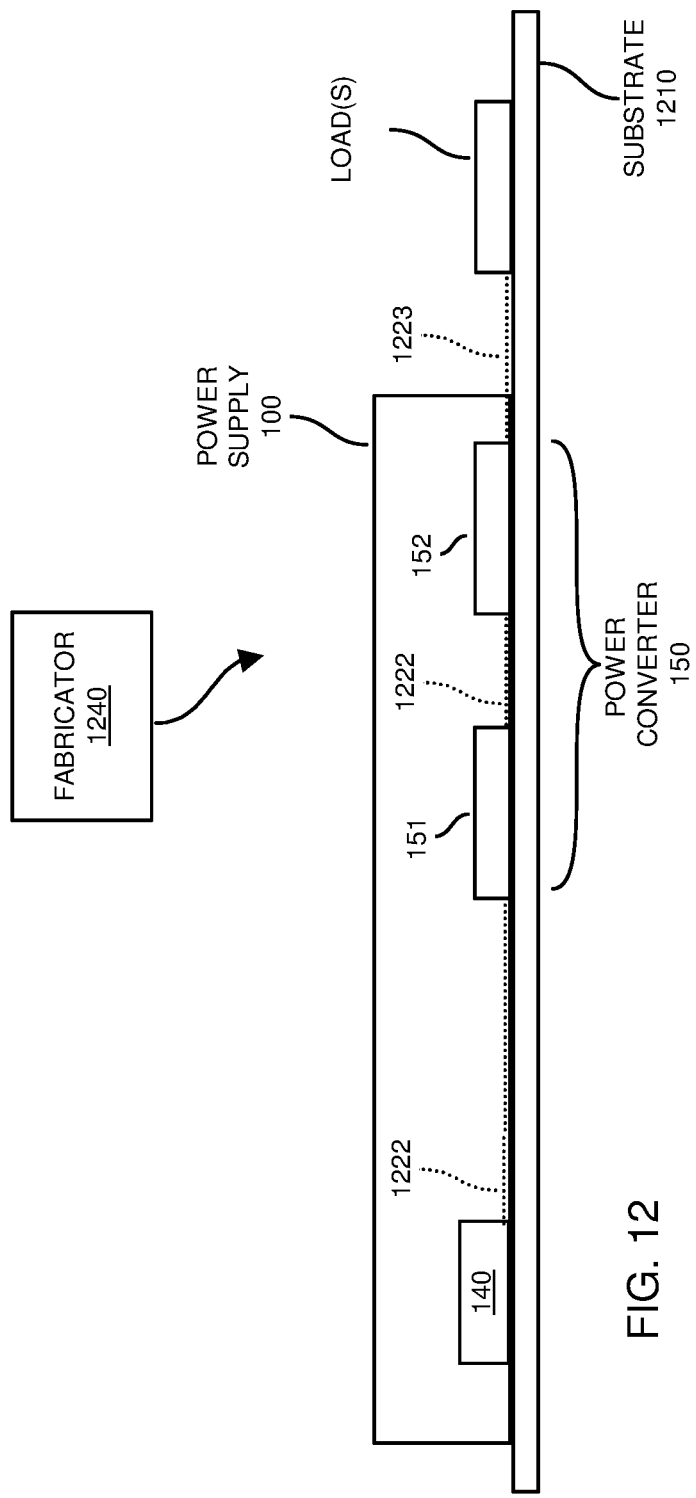
FIG. 12 is an example diagram illustrating assembly of a circuit including a partial power converter.

FIG. 12 is an example diagram illustrating assembly of a power supply and multiple interconnected power converter phases on a circuit board according to implementations herein.

In this example implementation, assembler 1240 receives a substrate 1210 and corresponding components of power supply 100 to fabricate controller 140, power converter 150 including the power converter stage 151 and power converter stage 152, etc. The assembler 1240 affixes (couples) the controller 140 and other components such as associated with the power supply 100 to the substrate 1210.

Via respective circuit paths 1222 as described herein, the assembler 1240 provides connectivity between the controller 140, power converter stage 151, power converter stage 152, etc.

Note that components such as the controller 140, power converter 150, and corresponding components can be affixed or coupled to the substrate 1210 in any suitable manner. For example, each of the one or more of the components in power supply 100 can be soldered to the substrate 1210, inserted into respective sockets disposed on the substrate 1210, etc.

Note further that the substrate 1210 is optional. Any of one or more circuit paths or connectivity as shown in the drawings and as described herein can be disposed in cables or other suitable medium.

In one nonlimiting example implementation, the one or more loads 118 can be disposed on its own substrate independent of substrate 1210; the substrate of the loads 118 (such as substrate 1210 or other substrate) is directly or indirectly connected to the substrate 1210 via connectivity 1223 such as one or more of wires, cables, links, etc. The controller 140 or any portion of the power supply 100 and corresponding power converter stages 151 and 152 can be disposed on a standalone smaller board plugged into a socket of the substrate 1210 as well.

Via one or more circuit paths 1223 (such as one or more traces, cables, connectors, wires, conductors, electrically conductive paths, etc.), the assembler 1240 couples the power supply 100 and corresponding components to the load 118. In one implementation, the circuit path 1223 conveys output voltages and corresponding currents to the load 118.

Accordingly, implementations herein include a system comprising: a substrate 1210 (such as a circuit board, standalone board, mother board, standalone board destined to be coupled to a mother board, host, etc.); a power supply system 100 including corresponding components as described herein; and a load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1210 or disposed at a remote location.

Note again that techniques herein are well suited for use in circuit applications such as those that that generate an output voltage to power a load. However, it should be noted that implementations herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred implementations thereof, it will be understood by those skilled in the art that various changes in form and details may be made therein without departing from the spirit and scope of the present application as defined by the appended claims. Such variations are intended to be covered by the scope of this present application. As such, the foregoing description of implementations of the present application is not intended to be limiting. Rather, any limitations to the invention are presented in the following claims.

The invention claimed is:

1. An apparatus comprising:
   a partial power converter operative to:
   receive an input voltage;
   convert the input voltage into multiple auxiliary voltages including a first auxiliary voltage and a second auxiliary voltage;
   produce a first output voltage as a first summation of the first auxiliary voltage and the input voltage; and
   produce a second output voltage as a second summation of the second auxiliary voltage and the input voltage.

2. The apparatus as in claim 1, wherein the partial power converter is operative to use at least a portion of power received from the first auxiliary voltage to produce the second auxiliary voltage during a condition in which the first auxiliary voltage is opposite in polarity with respect to the second auxiliary voltage.

3. The apparatus as in claim 1 further comprising:
   a first capacitor to store the first auxiliary voltage, the first capacitor being coupled in series with an input voltage source that provides the input voltage; and
   a second capacitor to store the second auxiliary voltage, the second capacitor being coupled in series with the input voltage source.

4. The apparatus as in claim 1, wherein the first auxiliary voltage is offset with respect to the input voltage; and
   wherein the second auxiliary voltage is offset with respect to the input voltage.

5. The apparatus as in claim 1, wherein the input voltage is received from a power source; and
   wherein the partial power converter is a bidirectional power converter operative to switch between: i) a first mode of outputting the first output voltage from a first port of the partial power converter and outputting the second output voltage from a second port of the partial power converter, and ii) a second mode of charging the power source based on a first voltage received from the first port and a second voltage received from the second port.

6. The apparatus as in claim 1, wherein the partial power converter includes:
   a primary side circuit operative to receive the input voltage, the primary side circuit including a first resonant circuit;
   a first secondary side circuit including a first secondary winding magnetically coupled to the primary side circuit, the first secondary side circuit operative to produce a first intermediate voltage that is converted into the first auxiliary voltage; and
   a second secondary side circuit including a second secondary winding magnetically coupled to the primary side circuit, the second secondary side circuit operative to produce a second intermediate voltage that is converted into the second auxiliary voltage.

7. The apparatus as in claim 6, wherein the first secondary side circuit includes a second resonant circuit operative to produce the first intermediate voltage; and wherein the second secondary side circuit includes a third resonant circuit operative to produce the second intermediate voltage.

8. The apparatus as in claim 1, wherein the partial power converter includes:
a first resonant capacitor supporting generation of the first auxiliary voltage; and
a second resonant capacitor supporting generation of the second auxiliary voltage.

9. The apparatus as in claim 1, wherein the partial power converter includes:
a first voltage polarity controller operative to control a polarity of the first auxiliary voltage; and
a second voltage polarity controller operative to control a polarity of the second auxiliary voltage.

10. The apparatus as in claim 1, wherein the partial power converter includes:
a first capacitor operative to store a first intermediate voltage derived from the input voltage, the partial power converter operative to convert the first intermediate voltage into the first auxiliary voltage; and
a second capacitor operative to store a second intermediate voltage derived from the input voltage, the partial power converter operative to convert the second intermediate voltage into the second auxiliary voltage.

11. The apparatus as in claim 1, wherein first transistors of the partial power converter are controlled to convert the input voltage into a first intermediate voltage and a second intermediate voltage; and
second transistors controlled to convert the first intermediate voltage into the first auxiliary voltage and the second intermediate voltage into the second auxiliary voltage.

12. The apparatus as in claim 1, wherein the partial power converter includes an LLC circuit operative to convert the input voltage into the first auxiliary voltage and the second auxiliary voltage.

13. The apparatus as in claim 11, wherein the partial power converter includes a first resonant power converter stage including a primary winding magnetically coupled to a first secondary winding and to a second secondary winding of a transformer;
wherein the first secondary winding is operative to produce a first intermediate voltage converted into the first auxiliary voltage; and
wherein the second secondary winding is operative to produce a second intermediate voltage converted into the second auxiliary voltage.

14. A method comprising:
receiving an input voltage;
converting the input voltage into multiple auxiliary voltages including a first auxiliary voltage and a second auxiliary voltage;
producing a first output voltage as a first summation of the first auxiliary voltage and the input voltage; and
producing a second output voltage as a second summation of the second auxiliary voltage and the input voltage.

* * * * *